US009296335B2

(12) United States Patent
Tuhro et al.

(10) Patent No.: US 9,296,335 B2
(45) Date of Patent: Mar. 29, 2016

(54) STANDBY VIRTUAL BUMPER FOR PARKED VEHICLE PROTECTION

(71) Applicant: Continental Automotive Systems, Inc., Auburn Hills, MI (US)

(72) Inventors: Matthew Conrad Tuhro, Sault Ste. Marie, MI (US); Bryan Coullard, Pickford, MI (US); Benjamin Mikel, Brimley, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 480 days.

(21) Appl. No.: 13/713,352

(22) Filed: Dec. 13, 2012

(65) Prior Publication Data

US 2014/0168435 A1  Jun. 19, 2014

(51) Int. Cl.
*G08G 1/16* (2006.01)
*B60Q 5/00* (2006.01)
*B60Q 1/48* (2006.01)

(52) U.S. Cl.
CPC . *B60Q 5/006* (2013.01); *B60Q 1/48* (2013.01)

(58) Field of Classification Search
CPC .......... B60Q 1/48; B60Q 5/006; B60Q 9/006; B60Q 9/007; B60Q 9/008; H04N 7/142; H04N 13/0468
USPC ................................................. 348/148, 435
See application file for complete search history.

(56) References Cited

U.S. PATENT DOCUMENTS

| 5,334,969 A * | 8/1994 | Abe et al. ................. 340/426.26 |
| 7,570,155 B2 * | 8/2009 | Horii ........................... 340/426.1 |
| 2008/0195273 A1 * | 8/2008 | Matsuura et al. ............... 701/34 |
| 2008/0204556 A1 * | 8/2008 | de Miranda et al. .......... 348/148 |

* cited by examiner

*Primary Examiner* — Huy T Nguyen

(57) ABSTRACT

A method of providing parked vehicle protection comprises determining if a vehicle ignition is in an off position and monitoring an exterior area proximate to a vehicle with a plurality of sensors when the vehicle ignition is off to detect an object proximate to the vehicle. The ECU determines whether the object is within a first object range and provides a first external warning when the object is within the first object range and determines whether the object is within a second object range and provides a second external warning when the object is within the second object range.

20 Claims, 3 Drawing Sheets

STANDBY VIRTUAL BUMPER FOR PARKED VEHICLE PROTECTION

TECHNICAL FIELD

The present disclosure relates to automotive vehicles, and more particularly to safety systems for automotive vehicles.

BACKGROUND

An automotive vehicle may include sensor arrays and cameras mounted to the vehicle to detect objects in the area around the vehicle for various safety systems for the vehicle and the driver. The vehicle utilizes the sensors and cameras to detect objects in the vehicle path. The various safety systems utilize the date to provide warnings to the driver and to initiate safety vehicle responses to minimize and/or avoid collisions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of providing parked vehicle protection comprises determining if a vehicle ignition is in an off position and monitoring an exterior area proximate to a vehicle with a plurality of sensors when the vehicle ignition is off to detect an object proximate to the vehicle. The ECU determines whether the object is within a first object range and provides a first external warning when the object is within the first object range and determines whether the object is within a second object range and provides a second external warning when the object is within the second object range.

A method of providing parked vehicle protection comprises determining if a vehicle ignition is in an off position and monitoring an exterior area proximate to a vehicle with a plurality of sensors when the vehicle ignition is off to detect an object proximate to the vehicle. The ECU determines whether the object is within a first object range and provides a first external warning by flashing at least one vehicle light when the object is within the first object range. The ECU also determines whether the object is within a second object range and provides a second external warning by flashing at least one vehicle light and sounding a horn for the vehicle when the object is within the second object range. Further, the ECU takes a picture of the object and determines if the object has made contact with the vehicle. An alert is sent for a vehicle owner if the object has made contact with the vehicle. The alert includes one of the picture and information obtained from the picture.

A parked vehicle protection system comprises a plurality of sensors to monitor an area proximate to the vehicle and an electronic control unit connected to the plurality of sensors to detect an object. The electronic control unit is configured with instructions for determining if a vehicle ignition is in an off position and monitoring an exterior area proximate to a vehicle with a plurality of sensors when the vehicle ignition is off to detect an object proximate to the vehicle. The ECU determines whether the object is within a first object range and provides a first external warning when the object is within the first object range and determines whether the object is within a second object range and provides a second external warning when the object is within the second object range. The ECU also takes a picture of the object.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
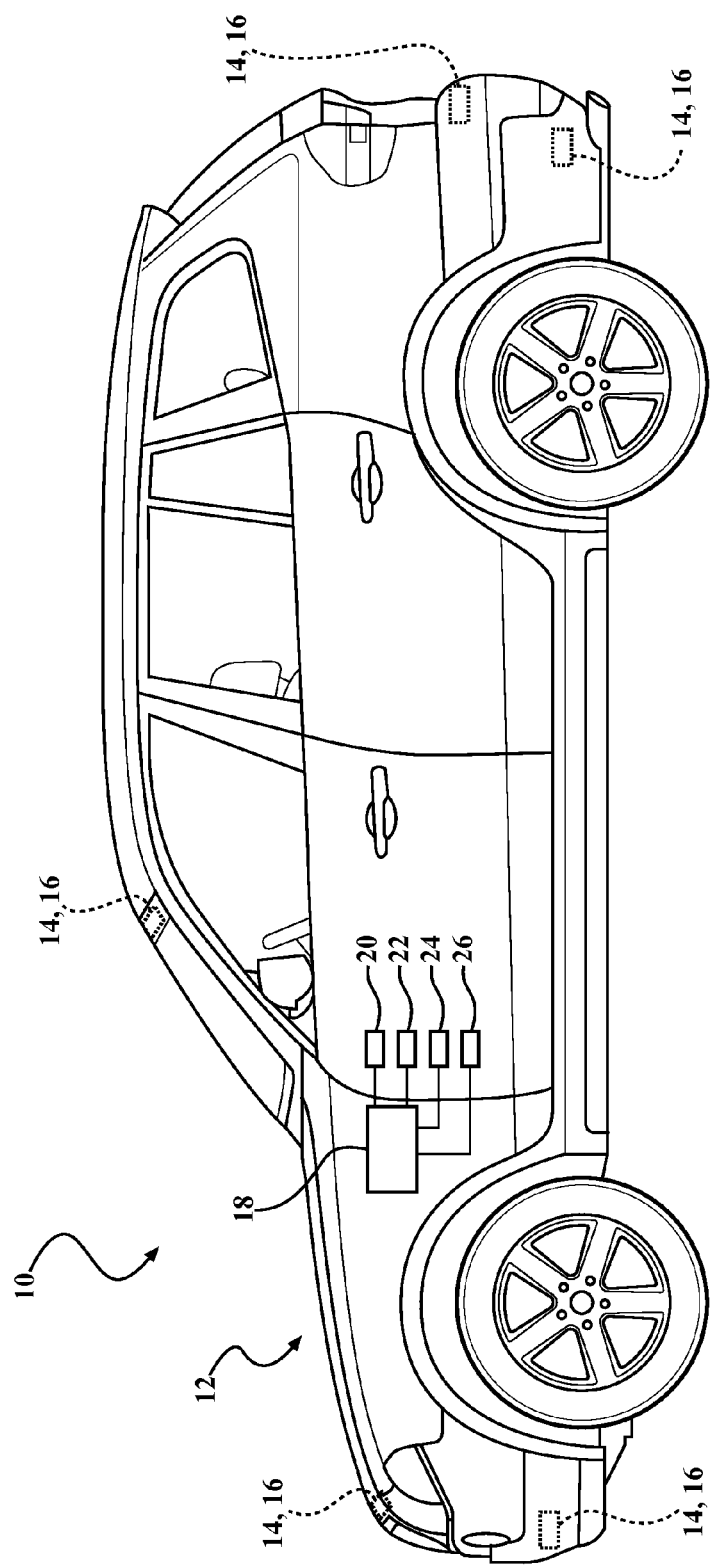
FIG. 1 is a schematic side view of a vehicle having a parked vehicle protection system of the present invention.

The following description is merely exemplary in nature and is in no way intended to limit the disclosure, its application, or uses. For purposes of clarity, the same reference numbers will be used in the drawings to identify similar elements. FIG. 1 is a schematic illustration of a vehicle 10 having a parked vehicle protection system 12. The parked vehicle protection system 12 preferably incorporates other existing vehicle 10 systems and may be utilize the same sensors and components, as described below. Throughout the applications the relative directions of forward and rear are in reference to the direction which an operator for the vehicle 10 would primarily be facing when operating the vehicle 10.

The parked vehicle protection system 12 may be connected to other systems for the vehicle 10. The parked vehicle protection system 12 utilizes sensors 14 located at various points around the vehicle 10. The parked vehicle protection system 12 also includes a forward facing camera 16A, a rear facing camera 16B and an electronic control unit (ECU) 18. The sensor(s) 14 may be any of a proximity, lidar, camera, etc. The sensors 14, cameras 16A, 16B and ECU 18 may be used by other systems for the vehicle 10. The ECU 18 receives input from the various sensors 14. The sensors 14 and cameras 16A, 16B may be located separately or together at any of the various locations depicted in FIG. 1. One skilled in the art would be able to determine which sensors and cameras and the locations of the sensors and cameras that may provide useful information to the parked vehicle protection system 12.

Figure 2:
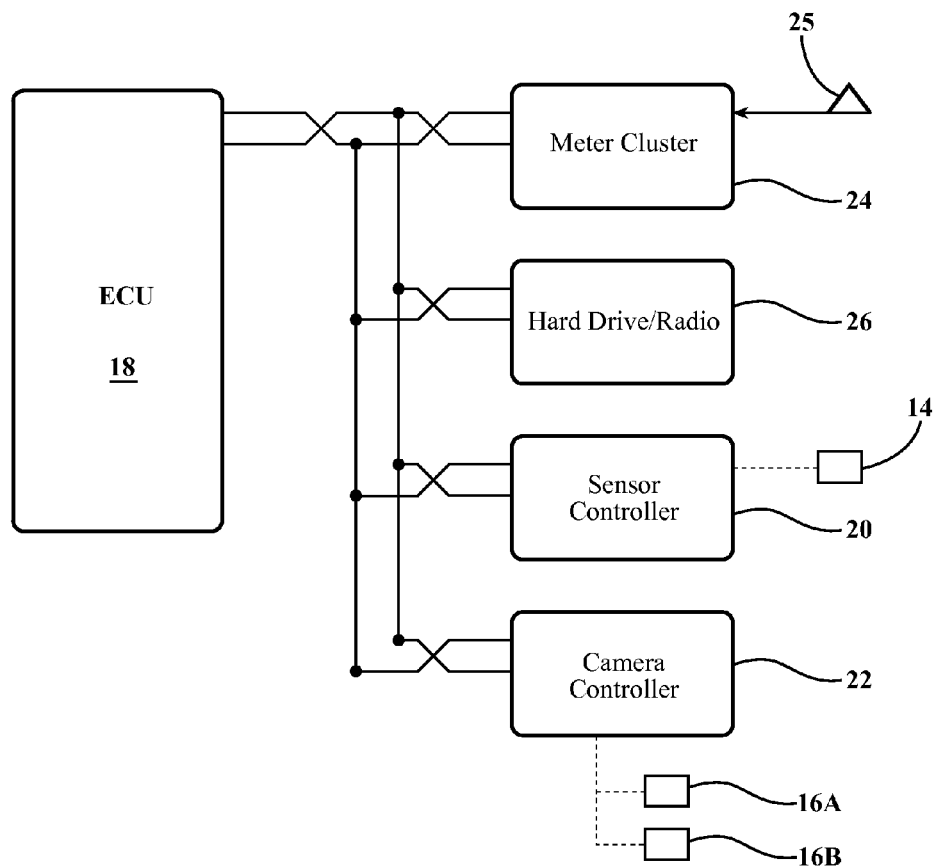
FIG. 2 is a schematic diagram of an exemplary hardware implementation of the parked vehicle protection system for the vehicle of FIG. 1.

FIG. 2 illustrates an example set of hardware that may be connected to the ECU 18 for the parked vehicle protection system 12 including a sensors controller 20 connected to the plurality of sensors 14, a camera controller 22 connected to the cameras 16A, B. An instrument panel control unit 24 may also be connected to the ECU 18 to place messages on the instrument cluster from the parked vehicle protections system 12 that the operator may view when returning to the parked vehicle 10. A enable/disable switch 25 to allow the operator to disable the parked vehicle protection system 12 may be associated with the instrument panel control unit 24. A hard drive/radio unit 26 may also be connected to send messages from the ECU 18 to the vehicle 10 operator.

The parked vehicle protection system 12 uses the sensors 14 to detect objects within range of the vehicle 10. The parked vehicle protection system 12 emits an exterior warning, e.g. flashing exterior vehicle lights or sounding the horn. Additionally, the cameras 16A, 16B can be used to record an image, e.g. a license plate, if the object makes contact with the vehicle 10.

Figure 3:
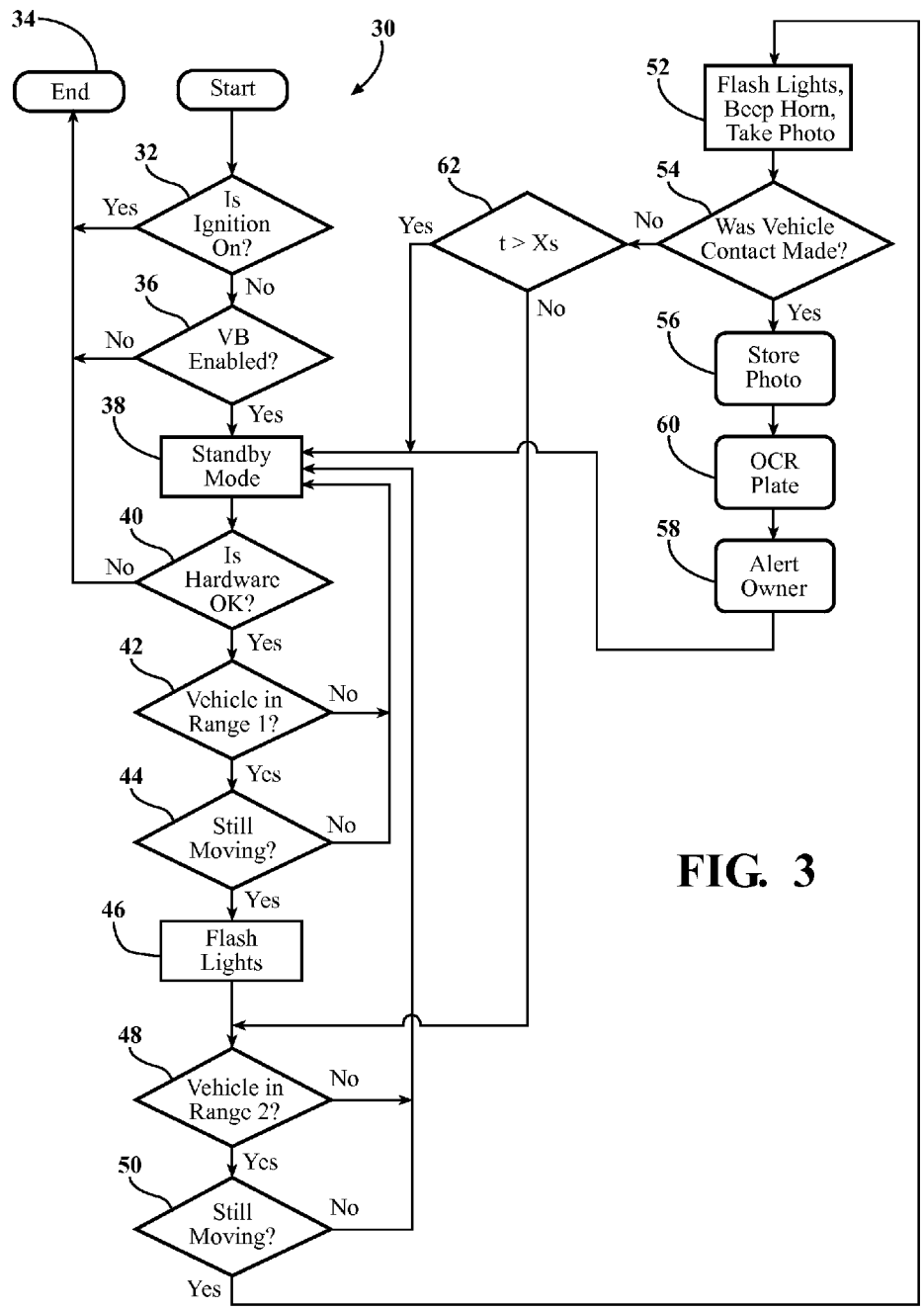
FIG. 3 is a schematic diagram of an exemplary software implementation of the parked vehicle protection system for the vehicle of FIG. 1.

FIGS. 1-3 illustrate one arrangement and method for using the parked vehicle protection system 12 to provide a virtual bumper for a vehicle 10. The parked vehicle protection system 12 uses data and sensor information from other vehicle systems that send the information to the ECU 18 for the parked vehicle protection system 12.

A method 30 starts by the ECU 18 determining whether an ignition for the vehicle 10 is on, shown at 32. If the ignition is on the vehicle 10 is running and the parked vehicle protection system 12 is not yet required. The ECU 18 ends the parked vehicle protection system 12 analysis, shown at 34. Alternately, the parked vehicle protection system 12 may be initiated once a vehicle 10 is in park regardless of whether the vehicle 10 is on. In this instance the ECU 18 would make the appropriate inquiry as to whether the vehicle 10 is in a parked gear.

The ECU 18 checks to make sure the parked vehicle protection system 12, i.e. "virtual bumper", is enabled, show at 36. The parked vehicle protection system 12, i.e. "virtual bumper", may be disabled in various circumstances, such as by request of the vehicle operator. The ECU 18 places the sensors 14 in standby mode, shown at 38. Standby mode is used to preserve power for the parked vehicle protection system 12 while keep the sensors 14 available for sensing objects and providing information. The ECU 18 checks that the hardware associated with the parked vehicle protection system 12 is ready for operation, shown at 40. If the hardware is not ready the parked vehicle protection system 12 discontinues, shown at 34. The hardware check includes determining if there is sufficient battery voltage ($V_{Batt}$) to run the system, check for malfunction in the sensors 14, etc.

The ECU 18 detects when an object is within a predetermined first range of the vehicle, shown at 42. For example, the sensors 14 may be ultrasonic sensors which may detect an object as it is approaching the vehicle 10. If the object is not within the first range the parked vehicle protection system 12 returns to standby mode, shown at 38. If the object is within the first range the ECU 18 determines from the sensors 14 whether the object is still moving, shown at 44. If the object stops moving the parked vehicle protection system 12 is not required to protect the vehicle 10 at this time and the parked vehicle protection system 12 returns to standby mode, shown at 38. If the object is still moving the parked vehicle protection system 12 provides a first warning external to the vehicle, shown at 46. For example, the ECU 18 sends a signal to flash the exterior lights for the vehicle 10.

The parked vehicle protection system 12 continues as the ECU 18 detects when an object is within a predetermined second range of the vehicle 10, shown at 48. If the object is not within the second range the parked vehicle protection system 12 returns to standby mode, shown at 38. If the object is within the second range the ECU 18 determines from the sensors 14 whether the object is still moving, shown at 50. If the object stops moving the parked vehicle protection system 12 is not required to protect the vehicle 10 at this time and the parked vehicle protection system 12 returns to standby mode, shown at 38. For example, the object may have stopped moving because the object is another vehicle that is now parked within the first or second range from the vehicle 10. If the object is still moving the parked vehicle protection system 12 provides a second warning external to the vehicle, shown at 52. For example, the ECU 18 sends a signal to flash the exterior lights for the vehicle 10 and sounds the horn.

The parked vehicle protection system 12 may use cameras 16A, 16B to capture the image of an object that impacts the vehicle 10. The picture can be used to identify who impacted the vehicle 10 and when the object impacted the vehicle 10 even when the vehicle operator is not present. For example, the picture may show a full or partial vehicle license plate and the picture may be time stamped by the system 12. Because of the mounting locations of the cameras 16A, 16B on the vehicle 10 it may be desirable to capture the image immediately before the impact occurs, rather than during or immediately after. For example, the cameras 16A, 16B may try to capture an image of a license plate when the object impacting the vehicle 10 is another vehicle. However, due to the locations of the camera 16A, 16B the license plate is not visible to the cameras 16A, 16B during the impact. Further, the camera 16A, 16B may be damaged during impact. Therefore, in some instances it may be desirable to capture an image when the object is within the second range, making impact likely to occur, but prior to the impact actually occurring. Therefore, the second warning actions, shown at 52 may also include capturing an image of the object.

The ECU 18 determines from the sensor(s) 14 data whether contact with the vehicle 10 was made, shown at 54. The parked vehicle protection system 12 may use impact or shock sensors 14 to determine if contact was made by the object. The parked vehicle protection system 12 may alternatively use other sensors in vehicle 10, such as sensors for an electronic stability control system. To conserve battery power for the vehicle 10 is separate sensors 14 are used to detect contact these sensors may not be powered until an object is detected within the first range. Therefore, power is not used by any additional sensors 14 for detecting contact between the object and vehicle until it appears such contact is likely to occur. The cameras 16 may also be powered once an object is detected within the first range and not before, since they are not needed to capture and image until the object is within the second range.

If contact was made the image captured during the second warning, shown at 52, is saved to memory for the vehicle 10, shown at 56. The parked vehicle protection system 12 alerts the driver of the vehicle 10, shown at 58. After the driver alert is sent the parked vehicle protection system 12 returns to standby mode, shown at 38.

The parked vehicle protection system 12 may be equipped within character recognition software to perform an analysis on the captured image and determine if identifying information, e.g. a vehicle license plate number can be recognized from the image, shown at 60.

The parked vehicle protection system 12 may alert the operator of the vehicle by sending a text, email, etc. from the vehicle 10 using the hard drive/radio 26. The information may be a copy of the image, or the text recognized by the OCR, shown at 60. Alternatively, the parked vehicle protection system 12 may alter the vehicle operator with a message displayed on the instrument cluster 24, prior to or following vehicle ignition. The image may then be displayed on a display for a radio/navigations system 26.

If the ECU 18 determines that contact was not made than after a predetermined amount of time, shown at 62, the parked vehicle protection system 12 will return to standby mode, shown at 38. While the time is less than the predetermined threshold, but contact has not been made the parked vehicle protection system 12 continues to monitor the object to see if it still within the second range, shown at 48.

As mentioned above, the driver may have the ability to override or deactivate the parked vehicle protection system 12 as desired. For example, to save battery power at the end of a battery life of when the vehicle will be parked for extended periods of time, e.g. the vehicle is in storage. The parked vehicle protection system 12 may also automatically disengage under certain circumstances, such as when sufficient battery power is not available.

Therefore, the parked vehicle protection system 12 can acts as a "virtual bumper" for the vehicle 10 to warn those who are about to impact the vehicle 10 and to provide evidence when contact with the vehicle 10 is made. The parked vehicle protection system 12 may be used to protect the front and rear bumpers of the vehicle 10 from other people parking forward or rear of the vehicle 10. The vehicle owner may use the parked vehicle protection system 12 to provide information to insurance, police, or other agencies in the case of damage to the vehicle 10 that occurs when the owner is not present.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of providing parked vehicle protection comprising:
   determining if a vehicle ignition is in an off position;
   monitoring an exterior area proximate to a vehicle with a plurality of sensors when the vehicle ignition is off to detect an object proximate to the vehicle;
   determining whether the object is within a first object range and providing a first external warning when the object is within the first object range;
   determining whether the object is within a second object range and providing a second external warning when the object is within the second object range; and
   taking a picture of the object when the object is within the second object range.

2. The method of claim 1, wherein providing the second external warning is at least two of: flashing the exterior lights of the vehicle, sounding a horn for the vehicle, providing another external warning signal.

3. The method of claim 1, further comprising determining if the object has made contact at any location with one of a body and a bumper of the vehicle.

4. The method of claim 3, further comprising performing a character recognition analysis on the picture with an electronic control unit for the vehicle to identify the object in the picture.

5. The method of claim 1, wherein monitoring the exterior area proximate to the vehicle with the plurality of sensors further comprises placing the parked vehicle protection system in standby mode to preserve battery power for the vehicle.

6. The method of claim 1, wherein the parked vehicle protection system is disabled when at least one of: the vehicle ignition is on, the battery power is insufficient to operate the system, the vehicle operator has disabled the system and there is a sensor failure.

7. The method of claim 1, wherein determining whether the object is within the first object range and determining whether the object is within the second object range further comprises determining if the object is still moving and when the object is not moving returning the parked vehicle protection system to standby mode.

8. The method of claim 1, wherein providing the first external warning is one of: flashing the exterior lights of the vehicle and sounding a horn for the vehicle.

9. A method of providing parked vehicle protection comprising:
   determining if a vehicle ignition is in an off position;
   monitoring an exterior area proximate to a vehicle with a plurality of sensors when the vehicle ignition is off to detect an object proximate to the vehicle;
   determining whether the object is within a first object range and providing a first external warning by flashing at least one vehicle light when the object is within the first object range;
   determining whether the object is within a second object range and providing a second external warning by flashing at least one vehicle light and sounding a horn for the vehicle when the object is within the second object range;
   taking a picture of the object when the object is within the second object range;
   determining if the object has made contact with the vehicle; and
   sending an alert for a vehicle owner if the object has made contact at any location with one of a body and a bumper of the vehicle, wherein the alert includes one of the picture and information obtained from the picture.

10. The method of claim 9, further comprising performing a character recognition analysis on the picture with an electronic control unit for the vehicle to identify the object in the picture.

11. The method of claim 9, wherein monitoring the exterior area proximate to the vehicle with the plurality of sensors further comprises placing the parked vehicle protection system in standby mode to preserve battery power for the vehicle.

12. The method of claim 9, wherein the parked vehicle protection system is disabled when at least one of: the vehicle ignition is on, the battery power is insufficient to operate the system, the vehicle operator has disabled the system and there is a sensor failure.

13. The method of claim 9, wherein determining whether the object is within the first object range and determining whether the object is within the second object range further comprises determining if the object is still moving and when the object is not moving returning the parked vehicle protection system to standby mode.

14. A parked vehicle protection system comprising:
   a plurality of sensors to monitor an area proximate to the vehicle;
   an electronic control unit connected to the plurality of sensors to detect an object, wherein the electronic control unit is configured with instructions for;
   determining if a vehicle ignition is in an off position;
   monitoring an exterior area proximate to a vehicle with a plurality of sensors when the vehicle ignition is off to detect an object proximate to the vehicle;
   determining whether the object is within a first object range and providing an external warning when the object is within the first object range;
   determining whether the object is within a second object range and providing an external warning when the object is within the second object range; and
   taking a picture of the object when the object is within the second object range.

15. The parked vehicle protection system of claim 14, wherein the electronic control unit is further configured with instructions for determining if the object has made contact at any location with one of a body and a bumper of the vehicle and sending an alert for a vehicle owner if the object has made contact with the vehicle, wherein the alert includes information obtained from the picture based on the character recognition analysis.

16. The parked vehicle protection system of claim 15, wherein the electronic control unit is further configured with instructions for performing a character recognition analysis on the picture to identify the object in the picture.

17. The parked vehicle protection system of claim 14, wherein the plurality of sensors are placed in standby mode to preserve battery power for the vehicle.

18. The parked vehicle protection system of claim 14, wherein the parked vehicle protection system is disabled when at least one of: the vehicle ignition is on, the battery power is insufficient to operate the system, the vehicle operator has disabled the system and there is a sensor failure.

19. The parked vehicle protection system of claim 14, the first external warning and the second external warning are one of: flashing the exterior lights of the vehicle, sounding a horn for the vehicle and providing another external warning signal.

20. The method of claim 4, further comprising sending an alert for a vehicle owner if the object has made contact with the vehicle, wherein the alert includes information obtained from the picture based on the character recognition analysis.

* * * * *